United States Patent [19]

Apte et al.

[11] Patent Number: 5,072,087

[45] Date of Patent: Dec. 10, 1991

[54] PROCESS FOR HEATING MATERIALS BY MICROWAVE ENERGY

[75] Inventors: Prasad S. Apte, Kingston; Robert M. Kimber, Sydenham; Aniket Pant, Inverary; Raymond Roy; David N. Mitchell, both of Kingston, all of Canada

[73] Assignee: Alcan International Limited, Montreal, Canada

[21] Appl. No.: 416,840

[22] Filed: Oct. 4, 1989

[30] Foreign Application Priority Data

Oct. 6, 1988 [CA] Canada .................................. 579522

[51] Int. Cl.⁵ .......................... H05B 6/64; C04B 35/64
[52] U.S. Cl. ...................... 219/10.55 M; 219/10.55 F; 264/26; 156/89; 156/272.4
[58] Field of Search ................. 219/10.55 M, 10.55 F, 219/10.55 E, 10.55 R, 10.55 A, 10.491; 264/25, 26, 27; 156/89, 272.2, 272.4; 419/48, 49

[56] References Cited

U.S. PATENT DOCUMENTS

| | | | |
|---|---|---|---|
| 2,622,187 | 12/1952 | Welch | 219/10.55 E |
| 3,335,253 | 8/1967 | Jeppson et al. | |
| 3,398,251 | 8/1968 | Jeppson et al. | |
| 3,469,053 | 9/1969 | Levinson | 219/10.55 R |
| 3,585,258 | 6/1971 | Levinson | 219/10.55 R |
| 4,100,386 | 7/1978 | Bardet | 219/10.55 M |
| 4,147,911 | 4/1979 | Nishitani | 219/10.55 M |
| 4,148,614 | 4/1979 | Kirkbride | 44/1 R |
| 4,219,361 | 8/1980 | Sutton et al. | 219/10.55 M |
| 4,307,277 | 12/1981 | Maeda et al. | 219/10.55 R |
| 4,529,856 | 7/1985 | Meek et al. | 219/10.55 M |
| 4,606,748 | 8/1986 | Blake et al. | 65/36 |
| 4,608,473 | 8/1986 | Paek et al. | 219/10.491 |
| 4,757,172 | 7/1988 | Palaith et al. | 219/10.55 M |
| 4,772,770 | 9/1988 | Matsui et al. | 219/10.55 B |
| 4,938,673 | 7/1990 | Adrian | 419/49 |

FOREIGN PATENT DOCUMENTS 0251256 1/1988 European Pat. Off. .
7338987 5/1975 France .
60-221367 11/1985 Japan .

OTHER PUBLICATIONS

Meek et al., "Microwave Sintering of Some Oxide Materials Using Sintering Aids," *J. Materials Sci. Letters*, vol. 6, No. 9, pp. 1060-1062 (1987).
Chemical Abstracts, vol. 104, No. 24, p. 286, No. 104:211927m (1986), Abstract of JP-A-60-221 367.
Wefers & Bell—"Oxides and Hydroxides of Aluminum", Technical Paper No. 19, Alcoa Research Laboratories, 2-73.

*Primary Examiner*—Philip H. Leung
*Attorney, Agent, or Firm*—Cooper & Dunham

[57] ABSTRACT

A process for preparing a heat-treated body from a material (preferably a dielectric ceramic) that does not couple well with microwaves while nevertheless using microwave energy for the heating step. The process involves the use of a microwave susceptor (i.e. a material that couples well with microwaves) as a means for generating heat in the material. To avoid contamination of the final product, a susceptor is chosen which is converted, during the heating step, to a substance which is substantially the same as the material itself, both the susceptor and the material are converted to the same desired final product, or the material is converted to a substance substantially the same as the susceptor. The resulting substantially pure heat-treated (and preferably sintered) bodies can be used for a variety of purposes, e.g. as substrates for micro-electronic devices. The process can also be used for joining bodies of non-susceptor materials without contaminating the resulting joint.

23 Claims, 1 Drawing Sheet

PROCESS FOR HEATING MATERIALS BY MICROWAVE ENERGY

BACKGROUND OF THE INVENTION

1. Field of the Invention

This invention relates to processes for heating materials (preferably dielectric ceramic materials) by means of microwave energy. More particularly, the invention relates to a process for preparing a heat-treated body from a material that does not couple well with microwaves but which nevertheless uses microwaves for the heating step.

2. Description of the Prior Art

The use of microwave energy rather than conventional thermal energy in industrial processes is becoming more widespread because of the rapid and economical heating that can thereby be achieved. However, many materials are either transparent to microwave energy or have low coupling efficiencies so that microwave energy cannot be used to heat these materials directly. In these cases, microwave susceptors are sometimes used to make microwave heating possible. Susceptors are materials that couple well with microwaves and thus generate heat when irradiated. If the susceptors are positioned close to the non-susceptible material, the latter is heated by conduction and/or radiation.

While this procedure is acceptable in many cases, it is not suitable when products of very high purity are required, e.g. sintered ceramic bodies for use in the electronics industry. If the susceptor is mixed directly within the body of material, it remains in the body after the heat treatment has been carried out. Alternatively, if the susceptor is used in the form of a bed surrounding the body, the susceptor contaminates the surface of the body and may in some cases penetrate into the interior. This can be seen from the prior art references discussed below.

Nishitani U.S. Pat. No. 4,147,911 issued on Apr. 3, 1979 discloses a method in which a dielectric material is mixed with 0.05 to 10% by weight of metal powder or other susceptor so that the resulting body may be heated and sintered by microwaves. The problem of contamination of the resulting product by the susceptor is recognized in this document itself (see column 3, line 64 to column 4, line 4), but the only suggested solution is "to carefully investigate the amount, particle size and quality of the substance to be added."

Sutton et al U.S. Pat. No. 4,219,361 issued on Aug. 26, 1980 also relates to the use of a susceptor with a non-susceptible material, but in this case the susceptor may be formed in situ by reactions which take place prior to the microwave heating step. Neverthless, contamination of the product remains.

Levinson U.S. Pat. No. 3,585,258 issued on June 15, 1971 describes the use of a susceptor both in and around the ceramic body to be treated, but again there will be contamination of the final product with the susceptor.

Accordingly, there is a need for a process for enabling non-susceptors to be heated by microwaves without contaminating the final product with an undesired material, and it is an object of the present invention to provide such a process.

SUMMARY OF THE INVENTION

Thus, according to the invention there is provided, a process for producing a heat-treated body of a desired material from a substance that does not couple well with microwaves, said process comprising: contacting said substance with a microwave susceptor; and irradiating the susceptor with microwaves to heat the susceptor and consequently said substance; wherein said substance, if substantially different from said desired material, and said susceptor, if substantially different from said desired material, are compounds which are at least partially converted, during said heating step, to products which are substantially uncontaminating of said body.

According to another aspect of the invention there is provided, in a method of joining bodies made of a substance that does not couple well with microwaves by bringing the bodies into contact, surrounding the resulting area of contact with a microwave susceptor and irradiating the susceptor with microwaves to heat and join the bodies, the improvement which comprises employing as at least one component of said susceptor, a substance which is at least partially converted during said heating step to a product which is substantially the same as said substance in order to reduce contamination of said bodies by said susceptor.

By the term "material that does not couple well with microwaves" (otherwise referred to as a "non-susceptor") we mean a material that cannot be heated to suitably high temperatures, either at all or in a reliable manner, when subjected to microwave irradiation at ambient temperatures.

By the term "susceptor" is meant a material that couples well with microwaves to the extent that it can be used to raise the temperature of the material to be treated to a desired temperature.

The invention and preferred embodiments thereof are explained in more detail below.

DETAILED DESCRIPTION OF THE INVENTION

Figure 1:
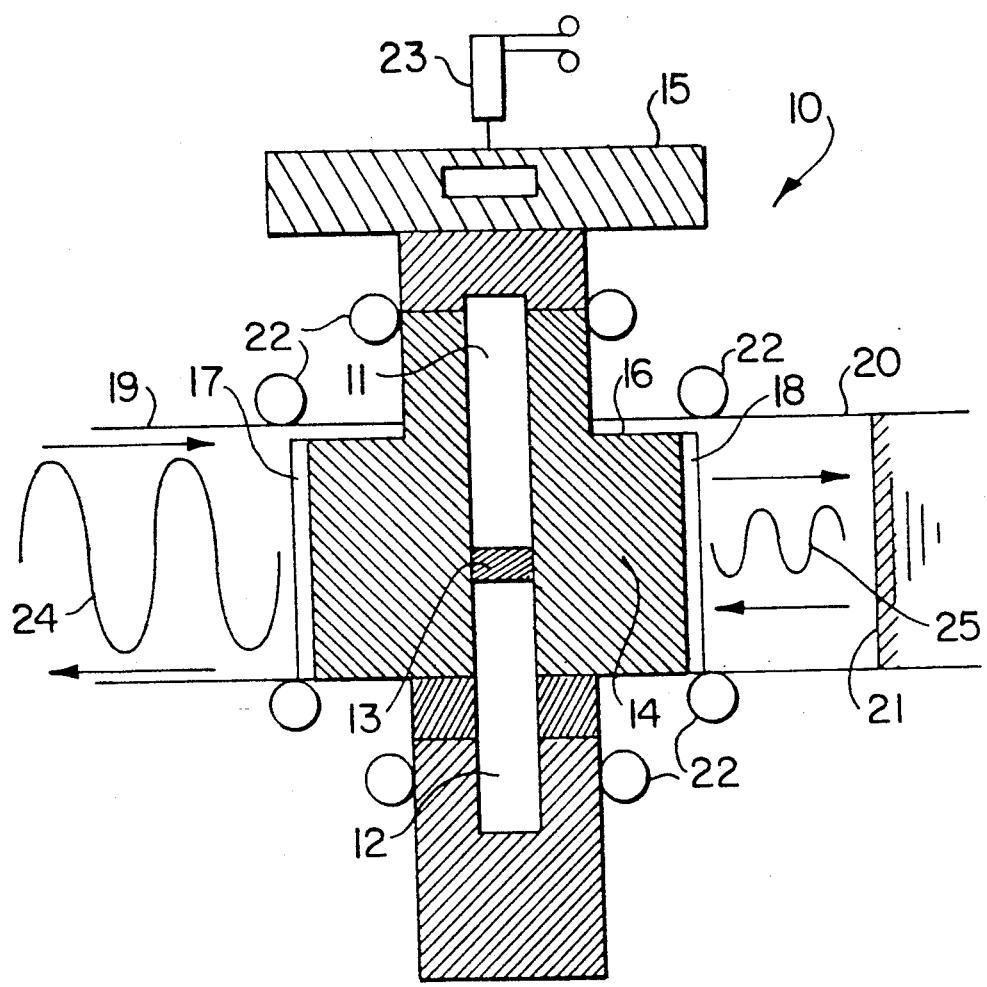
FIG. 1 of the accompanying drawings is a cross-section of an apparatus used for carrying out a preferred form of one aspect of the invention.

The susceptors used in the present invention may be mixed with the non-susceptor to be treated or used to form a powder bed surrounding a body of the non-susceptor to be treated. When the susceptor is mixed with a non-susceptor, the procedure is normally as follows. The susceptor and the non-susceptor are obtained in fine powder form, thoroughly mixed together and the resulting mixture is compressed to form a body of any desired shape, after which the body is subjected to the microwave heating and (usually) sintering step. The ratio of the susceptor to the non-susceptor depends on a number of factors, e.g. the heating efficiency of the susceptor, the power of the microwave radiation to which the body is subjected, etc. In the form of the invention where the susceptor is used to surround a body of the non-susceptor material, sufficient susceptor should be used to achieve the desired heating effect and the body should preferably be completely embedded in the susceptor.

If desired, the ratio of susceptor to non-susceptor in or around the body can be varied at different parts of the body in order to produce different heating characteristics at different locations within the body, or conversely, to avoid uneven heating if the body is not uniformly shaped.

The microwave equipment used to bring about the heating in the present invention may be entirely conventional and generally consists of a magnetron and a resonant cavity. The body to be sintered is held by any convenient means at a suitable position in the cavity. If the susceptor is not used in the form of a bed for the body to be heated, an insulating powder bed may be provided. The body and the bed may then be held in a suitable container made of a microwave-transparent material, e.g. quartz.

If desired, the heating process may be accompanied by compression of the body to be sintered, e.g. isostatic pressing, in order to form a dense shaped product.

Temperatures which can be achieved by the process of the invention may be up to about 2500° C. and usually fall within the range of 1600°–2200° C., which spans the sintering temperatures of most sinterable refractory materials. These temperatures can usually be reached within about 15–30 minutes in contrast to about 5 hours often required for conventional heating methods.

An underlying principle of the present invention is to select a non-susceptor and a susceptor and/or conditions during the heating step such that, after the heating step, either the susceptor is converted to the non-susceptor, the non-susceptor is converted to the susceptor or both the non-susceptor and the susceptor are converted to the same final product. In this way contamination can be avoided. However, while it is desirable that the final materials all be exactly the same, this is not always necessary in many cases. For example, the final products may be chemically the same but physically different (i.e. different isomers or allotropes), the final products may be physically the same (i.e. the same isomers or allotropes) and slightly chemically different (e.g. one a pure compound and the other an alloy with a small percentage of another material, or one may have water of crystallization and the other none), or the final products may be slightly different both physically and chemically. The overall result should however be that minimal contamination of the final product take place because of the conversion of the majority of one or both of the starting materials into a substance that is substantially uncontaminating of the desired final product.

The susceptors or non-susceptors which are converted, at least partially, to other products during the heating step include materials that are converted thermally (e.g. decomposed, dehydrated or changed from one isomer to another) and those that are converted chemically (e.g. oxidized, reacted with an available reagent or dissociated from water of crystallization).

In a first form of the invention, the non-susceptor remains the same during the heating step and the susceptor is at least partially converted to a material similar or identical to the non-susceptor. For example, the non-susceptor may be alpha alumina and the susceptor may be sub-alpha alumina.

Ceramic grade alpha alumina is not sinterable using commonly available microwave frequencies, for example 2.45 GHz or 0.915 GHz. It has one of the lowest loss factors and microwave radiation is not readily absorbed at room temperature (although it begins to absorb at elevated temperatures). However, sub-alpha aluminas are susceptors and are converted to alpha alumina when heated by microwaves to sintering temperatures above 1200° C. The alpha-$Al_2O_3$ is thermodynamically stable once formed. Consequently, by mixing a small proportion of sub-alpha alumina with a large proportion of alpha alumina and heating the resulting mixture to a suitably high temperature by microwave energy, a sintered body consisting entirely of alpha alumina can be obtained.

Alumina is commercially available as alpha alumina and beta alumina. Although beta alumina is a microwave susceptor, it is not converted to alpha alumina when heated and is thus not suitable as a susceptor for use in the present invention. In fact, beta alumina contains several atom percent of other materials, such as sodium oxide, and is therefore not merely a different isomer of aluminum oxide. In contrast, sub-alpha aluminas do not contain substantial amounts of other elements and merely represent different phases of pure alumina.

The phases of alumina are described in detail in "Oxides and Hydroxides of Aluminum" by Karl Wefers and Gordon M. Bell, Technical Paper No. 19, (1972) by Alcoa Research Laboratories. The sub-alpha phases can be prepared by thermal decomposition of aluminum hydroxides or by such other methods as heating ammonium alum or hydrated aluminum chloride. The phases included within the term "sub-alpha alumina" include, chi, kappa, gamma, delta, eta and theta phases as described in the above publication.

The amount of sub-alpha alumina relative to alpha alumina (when a body is formed from a mixture of those materials) is normally in the range of 5–15% by weight based on the total weight of the mixture. It has been found that a power range of 500–600 watts at 2.45 GHz is required for rapid heating at the 5% level, but that the power can be reduced to around 200 watts at the 15% level.

Other susceptors which exhibit phase changes upon microwave heating and which can be used in the first form of the present invention include gallium oxide.

As noted above, the conversion of the susceptor may be brought about by chemical means rather than mere thermal means. As an example, sub-alpha alumina may be used as a susceptor for a body of aluminum nitride. If the microwave heating and sintering step is carried out under an atmosphere of nitrogen or a nitrogen precursor (e.g. ammonia or an amine), the alumina from the susceptor is converted to aluminum nitride and the resulting body then consists entirely of aluminum nitride.

In a second form of the invention, the non-susceptor is converted during the heating step to a material that is similar or identical to the susceptor. This is not usually necessary because, if the final body is to consist of a susceptor, it can normally be heated directly without the intervention of another susceptor. However, there are occasions when this form of the invention is useful. For example, the susceptor may be expensive and the non-susceptor may be inexpensive. Furthermore, as a further example, zirconium oxide, $ZrO_2$, in pure form is monoclinic at room temperature, tetragonal at about 1200° C. and cubic at about 1500° C. The tetragonal and cubic forms are suceptors but the monoclinic form is not. Alloying of zirconium oxide with about 3 mol % of yttria, $Y_2O_3$, converts the zirconia to the tetragonal form at room temperature and alloying of the zirconia with about 10 mol % of yttria converts the zirconia to cubic form at room temperature. The alloys can therefore be used as susceptors for the pure zirconia. Depending on the temperature, the heating converts the pure zirconia to the tetragonal or cubic form which is identical to the susceptor (which stays the same) except for the few percent of yttria which is found not to diffuse into the pure zirconia body.

A third form of the invention involves converting both the non-susceptor and the susceptor into a third material that is desired in the final body. For example, a sub-alpha alumina may be used as a susceptor for alpha alumina and the heating step may be carried out in the presence of nitrogen or a nitrogen precursor and other necessary chemicals, e.g. carbon, so that alumina both from the susceptor and the non-susceptor are converted to aluminum nitride.

In practice, it is found that materials intended to be the same after the heating step may contain different minor impurities and materials intended to be fully converted during the heating step may be only partially converted. Despite these practical problems, however, the present invention can reduce contamination during microwave heating acceptable levels even for exacting applications.

The heat-treated products of the present invention can be used for a variety of purposes. For example, sintered products can be used as substrates for microelectronic chips, sintered tapes, microwave-transparent windows and tool bits. For many of these applications, the product must have high purity, controlled chemical composition, fine grain size and high density, all of which can be provided by the present invention.

The invention is not limited merely by sintering ceramic powders and can be used for various other thermal processes such as annealing and recrystallization of glassy phases.

The present invention may also be used for joining ceramics or other materials that do not couple well with microwaves. This can be achieved by placing (and preferably pressing) together the bodies to be joined, if desired with an intermediary interposed between the items. The items are then surrounded with a susceptor bed comprising a susceptor which is converted to the same material as that used for the bodies and the joint is irradiated with microwaves to raise the temperature of the materials in the vicinity of the joint so that partial melting or sintering takes place and, upon cooling, a satisfactory uncontaminated joint is formed.

A suitable procedure is explained with reference to FIG. 1 which shows equipment 10 for joining two sintered ceramic bodies 11 and 12 via an intermediary body 13. The intermediary body 13 is preferably a compressed sinterable green body made of the same material as the bodies 11 and 12 to be joined. The resulting joint area is surrounded by a susceptor bed 14 of a material that is in the manner mentioned above. The bodies 11, 12 and 13 are pressed together by means of a load 15. The powder bed is contained within a housing 16 which has microwave-transparent windows 17, 18 on opposite sides of the joint area. Waveguides 19 and 20 are aligned with the windows 17, 18. A magnetron (not shown) is connected to waveguide 19 and a grounded movable short 21 is positioned in waveguide 20. The apparatus is cooled by water pipes 22 and a linear vertical differential transducer 23 is used to measure movements of the load 15.

The bodies are joined by operating the magnetron and adjusting the position of the short 21 to create standing waves 24 and 25 in the waveguides so that the apparatus forms a resonant cavity with the joint area positioned for maximum microwave absorption.

The susceptor bed 14 increases in temperature and raises the temperature of the bodies 11, 12 and 13. The transducer 23 first registers an upward movement of the load 15 as the bodies expand and then a downward movement as the body 13 compacts, densifies and sinters. When there is no further movement of the load 15, the procedure is complete and the bodies can be allowed to cool.

The use of a material in accordance with the invention in the susceptor bed 14 ensures that there is little or no contamination of the joint area in the final product.

Detailed Examples of the invention are provided below. These Examples are illustrations only of the invention and should not be construed as limiting the scope of the invention.

EXAMPLE 1

Mixtures of α-alumina and sub-alpha alumina were prepared and subjected to microwave heating. The sub-alpha alumina was a trihydrate calcined at 600° C. for four hours (designated H-10).

The results are shown in Table 1 below.

TABLE 1

| SAMPLE | TEMPERATURE/ TIME | | POWER | OBSERVATIONS |
|---|---|---|---|---|
| 0% H-10 | — | 30 min | 200 W | No heating |
| 2% | — | 12 min | 150 W | no heating |
| 5% | — | 12 min | 200 W | no heating |
| 10% | — | 18 min | 200 W | no heating |
| 15% | 815* | 17 min | 200 W | orange color |
| 20% | 833* | 18 min | 200 W | orange color |
| 25% | | 6 min | 400 W | brilliant orange color |
| 75% | | 4 min | 200 W | white/orange |
| 100% | 1400*** | 11 min | 200 W | brilliant white color |

*Optical pyrometer readings. Note that this denotes a surface temperature and that the actual temperature within the sample is considerably higher.
**Type K thermocouple reading taken after the power was switched off.

Table 1 shows that the addition of the sub-alpha phase of alumina allows the α-phase to be heated.

It was found that, whenever the temperature exceeded 1200° C., the product consisted entirely of alpha alumina.

EXAMPLE 2

Mixtures of alpha alumina and sub-alpha alumina containing theta and gamma phases were heated in a similar manner to that outlined above. Table 2 summarizes the results. Again, it can be seen that the addition of the sub-alpha phase allows heating to occur. Without the additive heating does not occur. The product consisted entirely of alpha alumina, which suggests that the actual temperature reached exceeded 1200° C.

TABLE 2

| SAMPLE | TEMPERATURE/ TIME | | POWER | OBSERVATION |
|---|---|---|---|---|
| 5% additive | 37** | 66 min | 500 W | No heating |
| 10% additive | 1010** 673* | 41 min | 500 W | Orange white glow |
| 15% additive | 722* | 25 min | 500 W | Orange glow, arcing occurred. Sample arced due to overheating. |
| 20% additive | 720* | 30 min | 500 W | Orange glow. Sample arced due to overheating. |

*Optical pyrometer readings. Note that this denotes a surface temperature and that the actual temperature within the sample is considerably higher.
**Type K thermocouple reading taken after the power was switched off.

EXAMPLE 3

A cylinder of alpha alumina (AM2B) with a 10% addition of sub-alpha alumina (containing theta and gamma phases) was pressed to 5 kpsi. The compressed cylinder was 19 mm in diameter, 7 mm thick and 5 g in weight. The cylinder was embedded in approximately 15 g of alpha alumina powder in a quartz test tube. The assembly was then introduced into the microwave applicator. The cylinder was heated for 38 minutes at a power of 400 W. A red glow was observed after 18 minutes indicating that the cylinder was heating in the radiation field. After 27 minutes the color was white/orange indicating a temperature in excess of 1400° C. It is also to be noted that in this case the alpha alumina surrounding the cylinder showed no visible indication of high temperature. After cooling, the cylinder was found to consist entirely of alpha alumina.

From this experiment it is clear that alpha alumina which does not contain sub alpha phases does not heat in a microwave field. This experiment thus proves that a sub-alpha additive can be used to cause and control the heating of alpha alumina.

COMPARATIVE EXAMPLE 1

A cylinder of AM2B alpha alumina similar to that used in Example 3 was embedded in alpha alumina powder and introduced into the single mode applicator. The applied power was 1000 W for a period of 30 minutes. The temperature did not rise above 185° C. This shows that no appreciable heating occurs without the sub alpha-alumina additive.

EXAMPLE 4

Using a powder composed of α-alumina and 5% of theta/gamma sub-alpha alumina, a cylinder 19 mm in diameter, 7 mm thick and 5 g in weight was dry pressed at 5 kpsi. The cylinder was embedded in alumina trihydrate which had been previously calcined to 600° C. for 4 hours. The assembly was introduced into the single mode applicator. The cylinder was heated for 22 minutes at a power of 200 W. A bright orange glow was observed after 10 minutes indicating that the cylinder was heating in the radiation field. The observed microstructure showed that sintering occurred. In a second example using the same technique a cylinder was sintered to a density greater than 95%. X-Ray analysis of the cylinder showed it to be completely converted to alpha alumina.

EXAMPLE 5

Using a powder consisting wholly of α-alumina, a cylinder 19 mm in diameter, 7 mm thick and 5 g in weight was dry pressed at 5 kpsi. The cylinder was embedded in alumina trihydrate which had been previously calcined to 600° C. for 4 hours (to form a sub-alpha alumina). The assembly was introduced into a single mode applicator. The cylinder was heated for 28 minutes at a power of 200 W. A bright orange glow was observed after 10 minutes indicating that the cylinder was heating in the radiation field. The reduced diameter and thickness of the cylinder after sintering indicated that sintering to greater than 95% had occurred. The observed microstructure confirmed this. The powder bed was converted to alpha alumina during the heating step.

EXAMPLE 6

Using the apparatus shown in FIG. 1, two pre-sintered alpha alumina rods (having a density of about 98% theoretical) were joined via a compacted alpha alumina intermediary (having a density of about 50% theoretical).

The joint area was surrounded by a powder bed of sub-alpha alumina. The rods were held together by a slight pressure (5-10 MPa) and the joint area irradiated with microwaves having a powder of about 500 watts for 45-90 minutes.

After cooling, the rods were joined together The joint strength was 250 MPa compared with a strength of 300 MPa of the parent material.

The joined body was uncontaminated with sub-alpha alumina.

What we claim is:

1. A process of producing a heat-treated body of a refractory material from a substance that does not couple well with microwaves, said process comprising:
   contacting said substance with a microwave susceptor; and
   carrying out a heating step by irradiating the susceptor with microwaves to heat the susceptor and consequently said substance;
   wherein said substance, if different from said refractory material, and said susceptor, if different from said refractory material, are compounds which are converted, during said heating step, to a product having the same chemical composition as said refractory material.

2. A process according to claim 1 wherein said susceptor is converted to said product during said heating step.

3. A process according to claim 2 wherein said product is physically the same as said refractory material.

4. A process according to claim 2 wherein said susceptor is converted thermally to said product during said heating step.

5. A process according to claim 2 wherein said susceptor is converted chemically to said product during said heating step by reaction with a reagent.

6. A process according to claim 2 wherein said substance is alpha alumina and said susceptor is sub-alpha alumina.

7. A process according to claim 2 wherein said substance is aluminum nitride and said susceptor is sub-alpha alumina and wherein a nitrogen source is present during said heating step.

8. A process according to claim 1 wherein said substance is converted to said product during said heating step.

9. A process according to claim 8 wherein said product is physically the same as said refractory material.

10. A process according to claim 8 wherein said substance is converted thermally to said product during said heating step.

11. A process according to claim 8 wherein said substance is converted chemically to said product during said heating step by reaction with a reagent.

12. A process according to claim 8 wherein said substance is zirconia and said susceptor is an alloy of zirconia with a minor proportion of yttria.

13. A process according to claim 1 wherein said substance and said susceptor are both converted to said product during said heating step.

14. A process according to claim 13 wherein said substance and said susceptor are chemically converted during said heating step to said product by reaction with a reagent.

15. A process according to claim 14 wherein said substance is alpha alumina, said susceptor is sub-alpha alumina and said reagent is a nitrogen source.

16. A process according to claim 1 wherein said susceptor is present in said body before said heating step.

17. A process according to claim 1 wherein said susceptor substantially surrounds said body before said heating step.

18. A process according to claim 1 wherein said heating step raises the temperature of said body sufficiently to sinter said refractory material.

19. A process according to claim 1 wherein said body is subjected to pressing during said heating step.

20. A process according to claim 19 wherein said body is subjected to isostatic pressing.

21. In a method of joining bodies made of a substance that does not couple well with microwaves by bringing the bodies together and heating the bodies to join the bodies together, the improvement which comprises heating said bodies by surrounding adjacent areas of said bodies with a microwave susceptor and irradiating the susceptor with microwaves, while employing as at least one component of said susceptor, a substance which is at least partially converted during said heating step to a product which is substantially chemically the same as said substance in order to reduce contamination of said bodies by said susceptor.

22. A method according to claim 21 wherein a sinterable intermediary that is made of a material substantially the same as said substance is interposed between said bodies prior to irradiating said susceptor with microwaves.

23. A method according to claim 21 wherein said substance is alpha alumina and said susceptor is sub-alpha alumina.

* * * * *